United States Patent
Rauwolf et al.

(10) Patent No.: US 11,641,106 B2
(45) Date of Patent: May 2, 2023

(54) POWER DISTRIBUTION SYSTEM

(71) Applicant: HS Elektronik Systeme GmbH, Noerdlingen (DE)

(72) Inventors: Thomas Rauwolf, Noerdlingen (DE); Bernd Loefflad, Noerdlingen (DE)

(73) Assignee: HS ELEKTRONIK SYSTEME GMBH, Nordlingen (DE)

( * ) Notice: Subject to any disclaimer, the term of this patent is extended or adjusted under 35 U.S.C. 154(b) by 0 days.

(21) Appl. No.: 17/161,955

(22) Filed: Jan. 29, 2021

(65) Prior Publication Data

US 2021/0184460 A1 Jun. 17, 2021

Related U.S. Application Data

(63) Continuation of application No. 16/287,077, filed on Feb. 27, 2019, now Pat. No. 10,978,872.

(30) Foreign Application Priority Data

Mar. 9, 2018 (EP) .................................. 18160883

(51) Int. Cl.
*H02J 1/12* (2006.01)
*H02J 1/00* (2006.01)
*B60R 16/03* (2006.01)

(52) U.S. Cl.
CPC ............ *H02J 1/00* (2013.01); *B60R 16/0315* (2013.01); *H02J 1/12* (2013.01); *B64D 2221/00* (2013.01); *H02J 2310/44* (2020.01)

(58) Field of Classification Search
CPC ........ H02J 1/12; H02J 1/00; H02J 3/14; H02J 2310/44; B60R 25/01; B60R 16/03;
(Continued)

(56) References Cited

U.S. PATENT DOCUMENTS 5,808,371 A 9/1998 Kon i et al.
7,851,943 B2 12/2010 Datta et al.
(Continued)

FOREIGN PATENT DOCUMENTS

DE 19826028 A1 12/1998
EP 1553422 A1 7/2005
GB 2288291 A 10/1995

OTHER PUBLICATIONS

Extended European Search Report for International Application No. 18160883.7 dated Sep. 28, 2018, 10 pages.
(Continued)

*Primary Examiner* — Hai L Nguyen
(74) *Attorney, Agent, or Firm* — Cantor Colburn LLP

(57) ABSTRACT

Disclosed is a power distribution system, comprising a power feed line configured to supply electric power of a given power feed line voltage, a plurality of solid state power control modules connected to the power feed line; each of the solid state power control modules comprising at least one solid state power controller connected to at least one load to be supplied with power from the power feed line and configured to selectively connect the respective load to the power feed line or to disconnect the respective load from the power feed line; the power feed line comprising at least one power feed line segment connecting two adjacent solid state power control modules; wherein the at least two adjacent solid state power control modules are connected by a further electric line connected in parallel to the at least one power feed line segment.

5 Claims, 2 Drawing Sheets

(58) Field of Classification Search
CPC ......... B60R 16/0315; B60R 2011/0003; B60R 2011/004
USPC .......................................................... 307/11
See application file for complete search history.

(56) References Cited

U.S. PATENT DOCUMENTS

| | | |
|---|---|---|
| 9,143,029 B2 | 9/2015 | Sihler et al. |
| 9,660,446 B2 | 5/2017 | Toothman et al. |
| 10,579,085 B2 | 3/2020 | Chan et al. |
| 10,908,203 B2 * | 2/2021 | Sun ..................... H02H 1/0007 |
| 10,978,872 B2 * | 4/2021 | Rauwolf ............. B60R 16/0315 |
| 2001/0028241 A1 | 10/2001 | Saito et al. |
| 2019/0280479 A1 | 9/2019 | Rauwolf et al. |

OTHER PUBLICATIONS

European Patent Office Office Action for application No. 18160883.7 dated Jan. 4, 2022, 4 pages.

* cited by examiner

POWER DISTRIBUTION SYSTEM

CROSS-REFERENCE TO RELATED APPLICATIONS

This application is a Continuation of U.S. patent application Ser. No. 16/287,077 filed Feb. 27, 2019, now U.S. Pat. No. 10,978,872, which issued on Apr. 13, 2021, which claims priority to European Patent Application No. 18160883.7 filed Mar. 9, 2018 the entire contents of both of which is incorporated herein by reference.

BACKGROUND

Embodiments of the invention relate to a power distribution system, and more particularly to a power distribution architecture for distributing power to various electric loads in a vehicle, e.g. in an aircraft. Even more particularly, embodiments of the invention relate to fault current detection in such power distribution systems, in particular in power distribution systems having a ring architecture.

Typically, in a vehicle like an aircraft loads need to be supplied by different voltage levels or type of voltages. Every individual load requires its own power supply to convert the feeder voltage supplied by a power source in the vehicle to the necessary voltage level or voltage type. In combination with solid state power converters (SSPCs) switching power to these loads, a plurality of solid state power control modules are used to switch the feeder voltage to the loads as needed. Each solid state power control module comprises a plurality of SSPCs connected in parallel to the power feed line with each SSPC having an interface for connecting to the respective load. The plurality of solid state power control modules is fed by a same power source via the power feed line. For example, the solid state power control modules may be connected in a ring architecture in which each of the solid state power control modules forms a power feed line node and each two adjacent power feed line nodes are connected via a respective power feed line segment. The power feed line segments thus form a ring like structure which is connected to the power source at a power feed node (which may be formed by one of the solid state power control modules or may be a specific power feed node).

A problem with such configurations is detection of faults, particularly ground faults, in the power feed line segments. In case a ground fault occurs in one of the power feed line segments, the two power feed line nodes connected by the respective power feed line segment need to switch off that power feed line segment. This switching off has to be effected very fast. Classical communication between power feed line nodes, as is realized e.g. via a field bus system like CAN, has turned out too slow for effecting fast enough switching off of the respective two adjacent power feed line nodes in case of a fault in the respective power feed line segment.

It would be beneficial to provide a more efficient power distribution system being capable of fast switching off of adjacent power feed line nodes in case a fault occurs in one of the feeder line segments.

SUMMARY

Embodiments of the invention provide a power distribution system, comprising a power feed line configured to supply electric power of a given power feed line voltage, a plurality of solid state power control modules connected to the power feed line; each of the solid state power control modules comprising at least one solid state power controller connected to at least one load to be supplied with power from the power feed line and configured to selectively connect the respective load to the power feed line or to disconnect the respective load from the power feed line; the power feed line comprising at least one power feed line segment connecting two adjacent solid state power control modules; wherein the at least two adjacent solid state power control modules are connected by a further electric line connected in parallel to the at least one power feed line segment.

In particular, the power distribution system may be configured for managing and distributing electric power in an aircraft. Embodiments also provide an aircraft comprising the power distribution system.

Particular embodiments may include any of the following optional features, alone or in combination with other features:

Each two adjacent solid state power control modules may be connected by a respective power feed line segment and a respective further electric line may be connected in parallel to the respective power feed line segment.

The power distribution system may have a ring architecture formed by a plurality of solid state power control modules connected in series by respective power feed line segments, the power feed line segments forming a ring configuration.

The further electric line may be a simple wire connection. Thus, no particular bus system or communication protocol is needed. Information may be communicated by a change of voltage level on the wire connection, for example. This way of exchanging information is extremely simple, yet robust and extremely fast. In further embodiments, such communication may be realized by using twisted pair wires or a single wire as the further electric line.

Each of the two adjacent solid state power control modules connected by the at least one power feed line segment may comprise a current measurement unit configured for measuring a load current in the at least one power feed line segment. In particular, the current measurement unit may be configured for measuring a load current in the at least one power feed line segment or power feed line segments connecting the respective solid state power control module with its adjacent solid state power control module or its adjacent solid state power control modules.

Each of the two adjacent solid state power control modules connected by the at least one power feed line segment may comprise at least one voltage divider circuit connected to the respective further electric line. Further, each of the two adjacent solid state power control modules connected by the at least one power feed line segment may comprise a first voltage divider circuit connected to the further electric line at a first side thereof, and a second voltage divider circuit connected to another further electric line at a second side thereof. Particularly, each voltage divider circuit may comprise a first resistor and a second resistor connected in series in between a first defined DC voltage and a second defined DC voltage or ground, the further electric line connected in between the first and second resistors.

Particularly, the first and second resistors may have a same resistance.

Each voltage divider circuit may comprise a first switch connected in between the first DC voltage and the further electric line, and a second switch connected in between the further electric line and the second DC voltage or ground. Particularly, the first and second switches may be operated according to a direction of current in the at least one power feed line segment connecting the respective solid state power control module with the adjacent solid state power control module. For example, the first switch may be closed and the second switch may be open in case the direction of current in the at least one power feed line segment is from the solid state power control module towards the adjacent solid state power control module. Further, the first switch may be open and the second switch may be closed in case the direction of current in the at least one power feed line segment is from the adjacent solid state power control module towards the solid state power control module.

Each of the two adjacent solid state power control modules connected by the at least one power feed line segment may further comprise at least one comparator circuit assigned to the voltage divider circuit, the comparator circuit having an input connected in between the first and second resistors of the voltage divider circuit.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
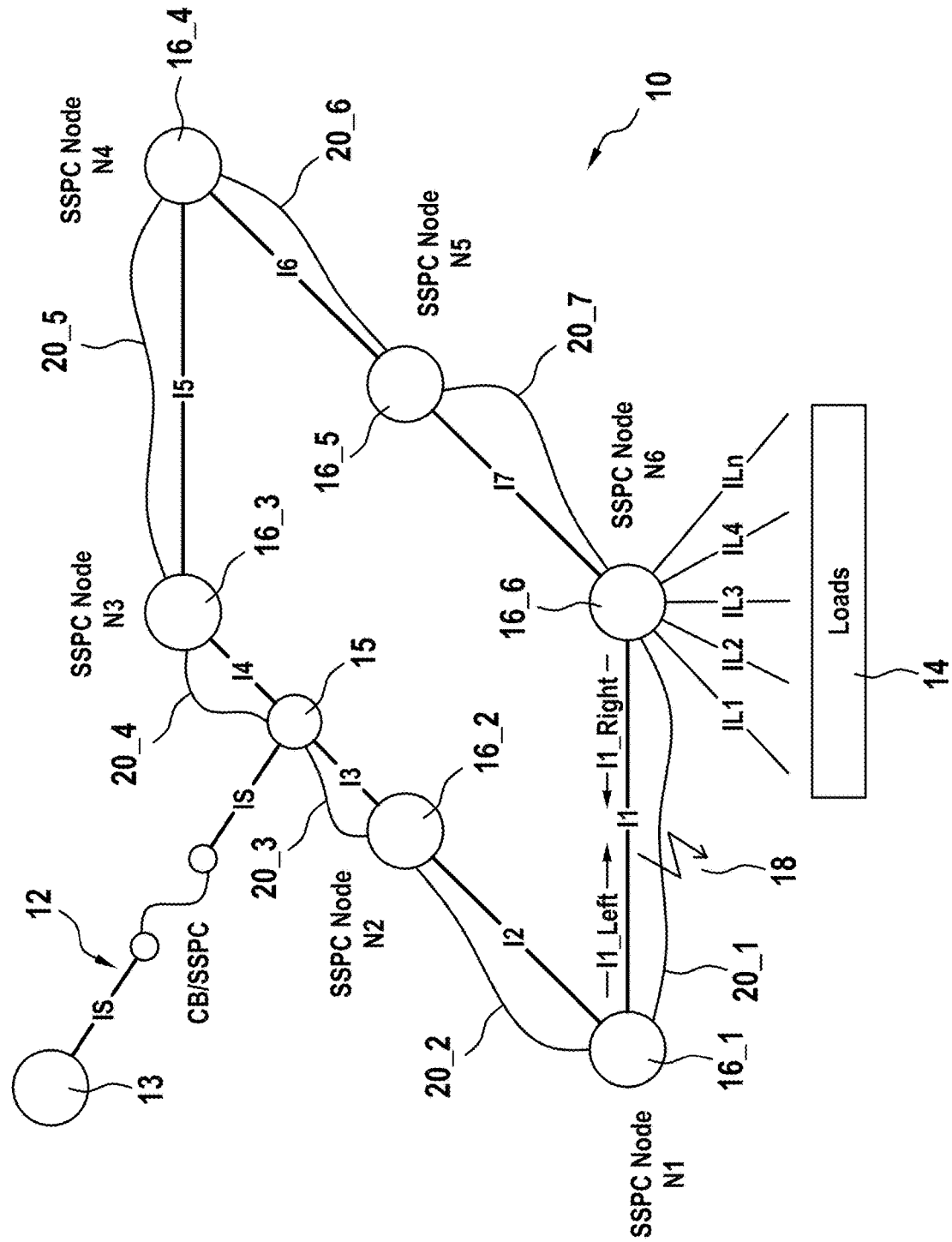
FIG. 1 illustrates a simplified block diagram of a ring power distribution architecture according to one embodiment.
Figure 2:
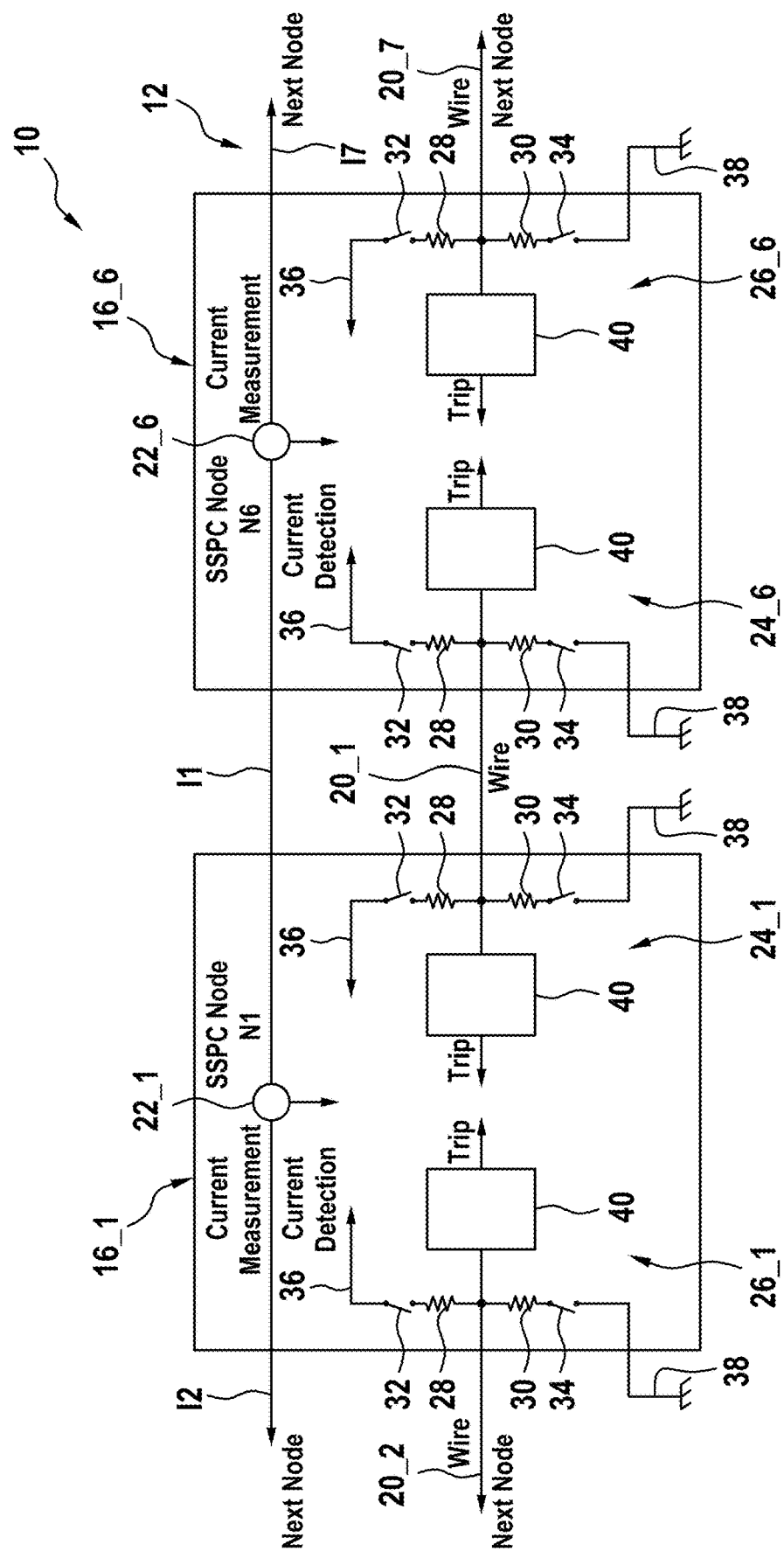
FIG. 2 illustrates a simplified block diagram of two adjacent solid state power control modules connected by a power feed line segment according to an embodiment.

Embodiments described herein relate to a power distribution system, generally indicated by 10 in FIGS. 1 and 2. The power distribution system 10 includes a power feed line 12 connected to a power source 13, loads (generally indicated at 14 in FIG. 1) and solid state power control modules 16_1 to 16_6. As indicated schematically only for one of the solid state power control modules 16_6 in FIG. 1, each solid state power control module 16_1 to 16_6 comprises a plurality of solid state power controllers (SSPCs) connected in parallel to the power feed line 12 with each SSPC having an interface for connecting to the respective load 14 (see the respective lines IL1 to ILn indicated in FIG. 1). The plurality of solid state power control modules 16_1 to 16_6 is fed by a same power source 13 via the power feed line 12. The power feed line 12 comprises a main power feed line segment IS connected via a power feed node 15 to a ring structure formed by power feed line segments 11 to 17. In the example shown in FIG. 1, the solid state power control modules 16_1 to 16_6 are connected in a ring architecture in which each of the solid state power control modules 16_1 to 16_6 forms a power feed line node (referred to as SSPC Nodes N1 to N6 in FIG. 1) and the solid state power control modules of each two adjacent power feed line nodes (in FIGS. 1: 16_1 and 16_2; 16_2 and 15; 15 and 16_3; 16_3 and 16_4; 16_4 and 16_5; 16_5 and 16_6; 16_6 and 16_1) are connected via a respective one of the power feed line segments 12; 13; 14; 15; 16; 17; 11. The power feed line segments 12; 13; 14; 15; 16; 17; 11 thus form a ring like structure which is connected to the power source 13 at the specific power feed node 15. Alternatively, the ring structure formed by the power feed line segments 12, 13, 14, 15, 16, 17, 11 may be connected to the power source 13 via one of the solid state power control modules 16_1, 16_2, 16_3, 16_4, 16_5, 16_6.

SSPCs are used in power management and distribution systems to replace traditional electromechanical circuit breakers. The main function of an SSPC is to distribute power and to protect various electrical loads. In comparison to electromechanical devices, SSPCs provide a relatively fast response time, and may eliminate arcing during turn-off transient and bouncing during turn-on transient. SSPCs facilitate advanced protection and diagnostics, allowing for efficient power management and distribution architectures. SSPCs include power semiconductor devices that control power (voltage and/or current) supplied to a load. SSPCs perform supervisory and diagnostic functions in order to identify and prevent overload and short circuit conditions. Components of SSPCs may include power semiconductor switching devices, sensors to monitor output voltage and current and power semiconductor device temperature, and control circuitry. The control circuitry may include a microcontroller consisting of an arithmetic logic unit (ALU), memory, timer/counters, serial port, input/output (I/O) ports, and clock oscillator. Some SSPCs are programmable by a computer, user or by any proprietary method.

FIGS. 1 and 2 both show a power distribution system 10 comprising a power feed line 12 (including main power feed line segment IS and the power feed line segments I1, I2, I3, I4, I5, I6, I7 forming the ring like structure) configured to supply electric power of a given power feed line voltage and a plurality of loads 14 to be supplied with power from the power feed line 12. Each of the loads requires power of a characteristic load voltage. The plurality of solid state power control modules 16_1 to 16_6 is connected between the power feed line 12 and the plurality of loads 14. Each of the solid state power control modules 16_1-16_6 is configured to selectively connect a respective load of the plurality of loads 14 to the power feed line 12 or to disconnect the respective load of the plurality of loads 14 from the power feed line 12. Each of the solid state power control modules 16_1 to 16_6 of the power distribution system further may comprise at least one power conversion module (not shown) configured to convert electric power from the power feed line voltage to a specific load voltage required by at least one of the loads 14. The at least one power conversion module is connected in between the power feed line 12 and the solid state power controllers of the respective solid state power control module 16_1-16_6 assigned to loads requiring the specific load voltage.

In the power distribution system 10 power received at each load 14 is adjusted by turning on and off SSPCs of the respective solid state power control module 16_1 to 16_6 connected in between the load 14 and the power feed line 12. By controlling the SSPCs that are turned on and off, the power distribution system 10 can isolate inactive loads or faulty loads of the plurality of loads 14 from the power feed line 12, while continuing to provide power to functional loads of the plurality of loads 14. The basic concept of this power distribution system 10 is that an incoming feeder voltage is received by the respective solid state power control module 16_1 to 16_6. The feeder voltage may be any voltage as typically used in the art. In particular, the feeder voltage may be any type of DC voltage, and may have any voltage level. In aircraft power distribution systems, typical feeder DC voltages include 28 V DC or 270 V DC. The power distribution system 10 is particularly configured for managing and distributing voltages of such voltage type and voltage level. One aspect of the power distribution system may be that within any of the solid state power control modules 16_1 to 16_6, the feeder voltage 12 gets converted to the voltage types and voltage levels needed for the various loads 14. Efficient DC/DC converters and/or DC/AC converters may be provided for carrying out such conversion.

An advantage of the ring architecture shown in FIG. 1 is that even in case a ground fault occurs in one of the power feed line segments l1 to l7 forming the ring structure (for example, in FIG. 1, a ground fault is indicated at 18 in the power feed line segment l1 connecting the solid state power control module 16_1 (SSPC Node N1) and the solid state power control module 16_6 (SSPC Node N6)), all solid state power control modules 16_1 to 16_6 can still be supplied with electric power from power source 13. However, it is required that the faulty power feed line segment in which the ground fault occurred (in FIG. 1: power feed line segment l1) is switched off. This switching off has to be realized by the solid state power control modules 16_1 and 16_6 forming the adjacent SSPC Nodes N1 and N6 with respect to the power feed line segment l1, respectively.

In order to control switching off of the respective pair of SSPC Nodes N1 to N6, 15 adjacent to a power feed line segment in case of a ground fault event, fast communication between the SSPC Nodes N1 to N6, 15 is provided. SSPC Nodes N1 to N6, 15 communicate via a field bus system, e.g. a CAN bus system (not shown in FIGS. 1 and 2). However, communication over this field bus system is considered not fast enough to allow timely switching off of the respective pair of Nodes N1 to N6, 15 in case of a ground fault 18. In the embodiment shown in FIGS. 1 and 2, the solid state power control modules 16_1 to 16_6 forming SSPC Nodes N1 to N6, and node 15, which form the ring structure, are pairwise connected by respective power feed line segments l1 to l7, i.e. each two adjacent SSPC Nodes N1 to N6 or solid state power control modules 16_1 to 16_6, and node 15 are connected by a respective power feed line segment l1 to l7, and are also connected via a further electric line 20_1 to 20_7. The further electric line 20_1 to 20_7 is connected in parallel to the respective power feed line segment l1 to l7 in between the corresponding nodes of the ring structure. The further electric line 20_1 to 20_7 may be formed by a single wire. Alternatively, the further electric line 20_1 to 20_7 may have a more complicated configuration, e.g. a twisted wire or a coaxial wire.

The further electric lines 20_1 to 20_7 provide a very fast communication of a ground fault in one of the power feed line segments l1 to l7 to the corresponding pair of adjacent SSPC Nodes N1 to N6, or node 15, based on the following principle:

A predetermined DC voltage is applied to each of the further electric lines 20_1 to 20_7 in normal operation. For each of the power feed line segments l1 to l7 forming the ring structure, this voltage can be controlled by the respective solid state power control modules 16_1 to 16_6, 15 forming the corresponding pair of adjacent nodes in the ring structure. A ground fault occurring in one of the power feed line segments l1 to l7 (e.g. the ground fault in power feed line segment l1 indicated at 18 in FIG. 1) will cause a change in the voltage level of the corresponding further electric line 20_1 to 20_7 (e.g. in the voltage level of the further electric line 20_1 in FIG. 1). This change in voltage level of the corresponding further electric line 20_1 to 20_7 can be detected by the respective adjacent solid state power control modules 16_1 to 16_7, 15 very fast. In response to such detection the solid state power control modules 16_1 to 16_6 may switch off the corresponding power feed line segment l1 to l7. This solution is very fast compared to classical communication, particularly much faster than normal serial bus communication using field bus systems like CAN. As a consequence of the fast switching off of the faulty power feed line segment l1 to l7 by its adjacent nodes (solid state power control modules) in the ring structure, other nodes of the ring structure, which in principle would also see the fault, are less subject to stress. It is possible to operate the power distribution system 10 in a ring structure without opening any of the power feed line segments l1 to l7 on purpose during normal operation to safely detect a fault. This saves time disconnecting the fault from the power distribution system. The circuit is small and robust.

Detection of a change of the voltage level on the further electric line 20_1 to 20_7 is based on the following principle: During normal operation, the load current I_load on the respective power feed line segment l1 to l7 connecting two adjacent SSPC Nodes N1 to N6, 15 flows from the one SSPC Node (e.g. from SSPC Node N1 or solid state power control module 16_1 in FIGS. 1 and 2) to the other SSPC Node (e.g. to SSPC Node N6 or solid state power control module 16_6 in FIGS. 1 and 2). Therefore, the direction of load current I_load detected by load current measurement units 22_1 to 22_6 of the respective adjacent SSPC Nodes (e.g. by load current measurement unit 22_1 of SSPC Node N1 and load current measurement unit 22_6 of SSPC Node N6 in FIGS. 1 and 2) is the same.

FIG. 1 indicates that a ground fault occurs in one of the power feed line segments l1 to l7 between two adjacent SSPC Nodes, namely in power feed line segment l1 at the location designated by 18. Power feed line segment l1 connects SSPC Node N1 (formed by solid state power control module 16_1) with SSPC Node N6 (formed by solid state power control module 16_6). As shown by the two arrows in FIG. 1, in case of ground fault 18, the load current I_load on the respective power line segment l1 connecting both SSPC Nodes N1 and N6, as detected by load current measurement unit 22_1 of SSPC Node N1 and load current measurement unit 22_6 of SSPC Node N6, respectively, no longer flows in a same direction. Rather, the load current I_load flows in a direction away from each of the SSPC Nodes N1, N6 towards the location of the ground fault 18 in the corresponding power line segment l1. E.g. in FIG. 1 the load current I_load detected by the first load current measurement unit 22_1 will flow from SSPC Node N1 (formed by solid state power control module 16_1) to the right towards the location of the ground fault 18. At the same time the load current I_load detected by the sixth load current measurement unit 22_6 will also flow away from the SSPC Node N6 (formed by solid state power control module 16_6) to the left towards the location of the ground fault 18.

This change in direction of the load current I_load when detected at the two adjacent SSPC Nodes N1, N6, respectively, may be used to cause a change in voltage level of the further electric line 20_1 connecting the respective SSPC Nodes N1 and N6 (in parallel to the power feed line segment l1 connecting the respective SSPC Nodes N1 and N6). Hence, it is possible to detect occurrence of the ground fault and also the location of the ground fault.

For example, detection of the ground fault 18 may be based on the following principle, using the circuit shown in FIG. 2. FIG. 2 shows the situation indicated in FIG. 1 with power feed line segment l1 connecting SSPC Node N1 (formed by the first solid state power control module 16_1) with SSPC Node N6 (formed by the sixth solid state power control module 16_6). SSPC Node N1 (formed by the first solid state power control module 16_1) includes first load current measurement unit 22_1 for detecting the direction of load current I_load in SSPC Node N1. SSPC Node N6 (formed by the sixth solid state power control module 16_6) includes a sixth load current measurement unit 22_6 for detecting the direction of load current I_load in SSPC Node N6. In addition to power feed line segment l1, SSPC Node N1 and SSPC Node N6 are also connected by a further electric line 20_1. Further electric line 20_1 is connected in parallel to power feed line segment l1.

As shown in FIG. 2 each of the two adjacent SSPC Nodes N1 (formed by the first solid state power control module 16_1) and N6 (formed by the sixth solid state power control module 16_6) connected by the at least one power feed line segment l1 comprises at least one voltage divider circuit 24_1, 24_6 connected to the respective further electric line 20_1.

FIG. 2 further shows that each of the two adjacent SSPC Nodes N1 (formed by the first solid state power control module 16_1) and N6 (formed by the sixth solid state power control module 16_6) also comprises a second voltage divider circuit 26_1, 26_6 connected to another further electric line 20_2, 20_7 at a second side thereof.

Each voltage divider circuit 24_1, 24_6 comprises a first resistor 28 and a second resistor 30 connected in series in between a first predefined DC voltage 36 and a second predefined DC voltage or ground 38. The further electric line 20_1 is connected in between the first resistor 28 and the second resistor 30 of the voltage divider circuits 24_1 and 24_6. In the embodiment shown the first and second resistors 28 and 30 have a same resistance. Other resistance values may be selected for the first and second resistors, if desired.

Each voltage divider circuit 24_1 and 24_6 further comprises a first switch 32 connected in between the first DC voltage 36 and the further electric line 20_1. Moreover, each voltage divider circuit 24_1 and 24_6 further comprises a second switch 34 connected in between the further electric line 20_1 and the second DC voltage or ground 38.

The first and second switches 32, 34 of the solid state power control module 16_1 are operated according to a direction of load current I_load detected by the respective first load current measurement unit 22_1 in the at least one power feed line segment l1 connecting the first solid state power control module 16_1 with the adjacent sixth solid state power control module 16_6. The first and second switches 32, 34 of the sixth solid state power control module 16_6 are operated according to a direction of load current I_load detected by the respective sixth load current measurement unit 22_6 in the at least one power feed line segment l1 connecting the sixth solid state power control module 16_6 with the adjacent first solid state power control module 16_1.

The following rule applies: The first switch 32 of the first solid state power control module 16_1 is closed and the second switch of the first solid state power control module 16_1 is open in case the direction of load current I_load detected by the first load current measurement unit 22_1 in the at least one power feed line segment l1 is from the first solid state power control module 16_1 towards the adjacent sixth solid state power control module 16_6 (load current flows in outward direction). Correspondingly, the first switch 32 of the sixth solid state power control module 16_6 is closed and the second switch of the sixth solid state power control module 16_6 is open in case the direction of load current I_load detected by the sixth load current measurement unit 22_6 in the at least one power feed line segment l1 is from the sixth solid state power control module 16_6 towards the adjacent first solid state power control module 16_1 (load current flows in outward direction).

The first switch 32 of the first solid state power control module 16_1 is open and the second switch 34 of the first solid state power control module 16_1 is closed in case the direction of load current I_load detected by the first load current measurement unit 22_1 in the at least one power feed line segment l1 is from the adjacent sixth solid state power control module 16_6 towards the first solid state power control module 16_1 (load current flows in inward direction). The first switch 32 of the sixth solid state power control module 16_6 is open and the second switch 34 of the sixth solid state power control module 16_6 is closed in case the direction of load current I_load detected by the sixth load current measurement unit 22_6 in the at least one power feed line segment l1 is from the adjacent first solid state power control module 16_1 towards the sixth solid state power control module 16_6 (load current flows in inward direction).

Therefore, in normal operation (i.e. in the absence of a ground fault on the power feed line segment l1) load current will flow in outward direction at the first solid state power control module 16_1, and therefore the first switch 32 of the first solid state power control module 16_1 will be closed and the second switch 34 of the first solid state power control module 16_1 will be open. In contrast, in normal operation (i.e. in the absence of a ground fault on the power feed line segment l1) load current will flow in inward direction at the sixth solid state power control module 16_6, and therefore the first switch 32 of the sixth solid state power control module 16_6 will be open and the second switch 34 of the sixth solid state power control module 16_6 will be closed. As a result, the voltage level on the further electric line 20_1 will be half the difference between the first DC voltage 36 and the second voltage or ground 38.

In case of a ground fault on the power feed line segment l1, load current I_load will flow in outward direction at the first solid state power control module 16_1, and therefore the first switch 32 of the first solid state power control module 16_1 will be closed and the second switch 34 of the first solid state power control module 16_1 will be open. However, in case of a ground fault on the power feed line segment l1, also load current I_load will flow in outward direction at the sixth solid state power control module 16_6, and therefore the first switch 32 of the sixth solid state power control module 16_6 will be closed and the second switch 34 of the sixth solid state power control module 16_6 will be open. As a result, the voltage level on the further electric line 20_1 will change (increase in this case) and no longer be equal to half the difference between the first DC voltage 36 and the second voltage or ground 38.

Each of the two adjacent solid state power control modules 16_1, 16_6 connected by the at least one power feed line segment l1 comprises at least one comparator circuit 40. The comparator circuit 40 is assigned to the respective voltage divider circuit 24_1, 24_6. The comparator circuit 40 has an input connected in between the first and second resistors 28, 30 of the respective voltage divider circuit 24_1, 24_6. Thus, the input of the comparator circuit 40 is supplied with a voltage corresponding to the voltage level on the further electric line 20_1. A change in the voltage level on the further electric line can thus be detected by comparator 40, and in response to detection of a change in voltage level at the comparator input, a switch off operation of the power feed line segment l1 will be tripped by the comparator.

The first solid state power control module 16_1 also comprises a second voltage divider circuit 26_1 at a side opposite to the side of the first voltage divider circuit 24_1. The sixth solid state power control module 16_6 also comprises a second voltage divider circuit 26_6 at a side opposite to the side of the first voltage divider circuit 24_6. The second voltage divider circuit 26_1 of the first solid state power control module 16_1 is connected to another further electric line 20_2. The second voltage divider circuit 26_6 of the first solid state power control module 16_6 is connected to another further electric line 20_7. Otherwise the second voltage divider circuits 26_1 and 26_6 have the same configuration as the first voltage divider circuits 24_1 and 24_6 described in detail above. Reference is made to this description which also applies with respect to the second voltage divider circuits.

The power management and distribution system 10 is configured for managing and distributing electric power in an aircraft.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power distribution system, comprising
a power feed line configured to supply electric power of a given power feed line voltage; and
a plurality of solid state power control modules connected to the power feed line; each of the solid state power control modules comprising at least one solid state power controller connected to at least one load to be supplied with power from the power feed line and configured to selectively connect the respective load to the power feed line or to disconnect the respective load from the power feed line;
the power feed line comprising at least one power feed line segment connecting two adjacent solid state power control modules;
wherein the at least two adjacent solid state power control modules are connected by a further electric line connected in parallel to the at least one power feed line segment;
wherein each two adjacent solid state power control modules are connected by a respective power feed line segment and a respective further electric line is connected in parallel to the respective power feed line segment;
wherein the power distribution system has a ring architecture formed by the plurality of solid state power control modules forming SSPC nodes of the ring architecture and connected in series by respective power feed line segments forming a ring configuration; wherein in case a ground fault occurs in one of the power feed line segments forming the ring configuration, respective switches of two of the solid state power control modules forming adjacent SSPC nodes with respect to the faulty power feed line segment are switched off, while all solid state power control modules forming the SSPC nodes of the ring architecture can still be supplied with electric power by the remaining power feed line segments of the ring configuration.

2. The power distribution system according to claim 1, wherein the further electric line is a wire connection.

3. The power distribution system according to claim 2, wherein the wire connection is a twisted pair wire or a single wire.

4. The power distribution system according to claim 1, wherein each of the two adjacent solid state power control modules connected by the at least one power feed line segment comprises a current measurement unit configured for measuring a load current in the at least one power feed line segment.

5. The power distribution system according to claim 1, wherein each of the two adjacent solid state power control modules connected by the at least one power feed line segment comprises at least one voltage divider circuit connected to the respective further electric line.

* * * * *